(12) United States Patent
Kang (10) Patent No.: US 8,587,736 B2
(45) Date of Patent: Nov. 19, 2013

(54) STEREOSCOPIC IMAGE DISPLAY DEVICE AND DRIVING METHOD THEREOF

(75) Inventor: Dongwoo Kang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 169 days.

(21) Appl. No.: 13/173,511

(22) Filed: Jun. 30, 2011

(65) Prior Publication Data

US 2012/0002123 A1 Jan. 5, 2012

(30) Foreign Application Priority Data

Jul. 2, 2010 (KR) .................. 10-2010-0063836

(51) Int. Cl.
*G02F 1/13* (2006.01)
*G02F 1/1335* (2006.01)

(52) U.S. Cl.
USPC .................. 349/15; 349/13; 349/98

(58) Field of Classification Search
None
See application file for complete search history.

(56) References Cited

U.S. PATENT DOCUMENTS

| 4,877,307 | A | * | 10/1989 | Kalmanash | ............... | 359/465 |
| 5,113,285 | A | * | 5/1992 | Franklin et al. | ............... | 359/465 |
| 2004/0263060 | A1 | * | 12/2004 | Gilmour et al. | ............... | 313/501 |
| 2010/0060721 | A1 | * | 3/2010 | Chen et al. | ............... | 348/51 |
| 2011/0018984 | A1 | * | 1/2011 | De Bougrenet De La Tocnaye et al. | ............... | 348/57 |
| 2011/0063424 | A1 | * | 3/2011 | Matsuhiro et al. | ............... | 348/58 |
| 2012/0105746 | A1 | * | 5/2012 | Min et al. | ............... | 349/13 |

FOREIGN PATENT DOCUMENTS

JP   10-239641 A   *   9/1998

* cited by examiner

*Primary Examiner* — Mike Stahl
(74) *Attorney, Agent, or Firm* — Morgan, Lewis & Bockius LLP (57) ABSTRACT

A stereoscopic image display device includes a display panel provided with a pixel array, a rendering processing unit that performs rendering for odd left image data and even right image data during an n-th frame period, and performs rendering for odd right image data and even left image data during a (n+1)-th frame period, a patterned retarder including a first retarder that transmits light so as to be modulated into first circularly polarized light and a second retarder that transmits light so as to be modulated into second circularly polarized light, active retarder glasses including a first active retarder that transmits one of the first circularly polarized light and the second circularly polarized light, and a second active retarder that transmits the remaining one of the first circularly polarized light and the second circularly polarized light, and a control unit that generates a switchable control signal.

14 Claims, 5 Drawing Sheets

FIG. 1

(RELATED ART)

FIG. 2

(RELATED ART)

STEREOSCOPIC IMAGE DISPLAY DEVICE AND DRIVING METHOD THEREOF

This application claims the benefit of Korea Patent Application No. 10-2010-0063836 filed on Jul. 2, 2010, which is incorporated herein by reference for all purposes as if fully set forth herein.

BACKGROUND

1. Field

This document relates to a stereoscopic image display device and a driving method thereof capable of implementing a three-dimensional stereoscopic image (hereinafter, referred to as a "3D image").

2. Related Art

A stereoscopic image display device implements 3D images using a stereoscopic technique and an autostereoscopic technique.

The stereoscopic technique uses binocular parallax images which are great in the stereoscopic effect, which has a type of using glasses and a type of not using glasses, and both the types are put into practical use. In the type of not using glasses ("glassless type"), the stereoscopic images are implemented by dividing optical axes of binocular parallax images, by using optical plates such as parallax barriers provided at front or rear surfaces of a display panel. In the type of using glasses ("glasses type"), binocular parallax images are displayed on a display panel, and polarization glasses or liquid crystal shutter glasses are used to implement stereoscopic images.

Figure 1:
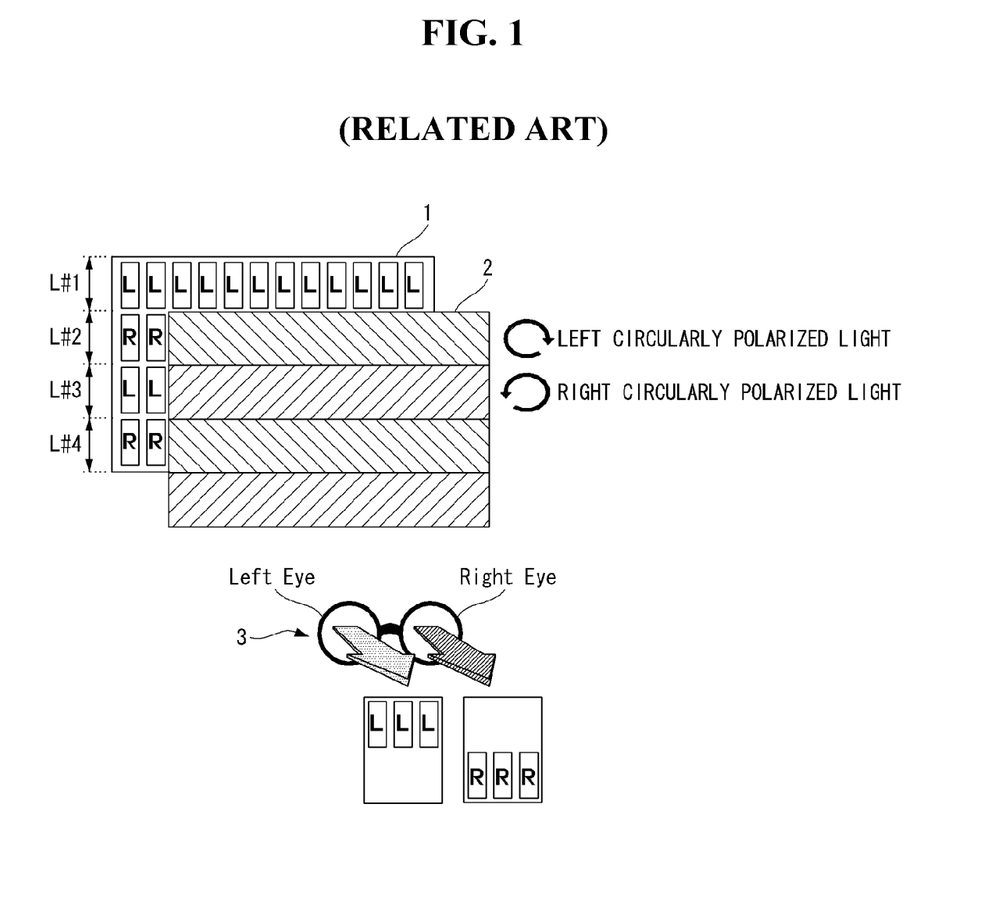
FIG. 1 is a diagram illustrating a polarization glasses type in the related art.

The polarization glasses type includes a patterned retarder 2 which is attached to a display panel 1 as shown in FIG. 1. The polarization glasses type alternately displays left image data L and right image data R on the display panel 1 with horizontal line units and switches polarization characteristics incident to the polarization glasses 3 via the patterned retarder 1. Thereby, the polarization glasses type can implement 3D images by spatially dividing left images and right images.

The polarization glasses type has advantages in that crosstalk between the left eye and the right eye is small and luminance is high; however, since the left images and the right images are displayed through the spatial division, the vertical resolution of each of the left images and the right images is a half of the physical vertical resolution of the panel.

Figure 2:
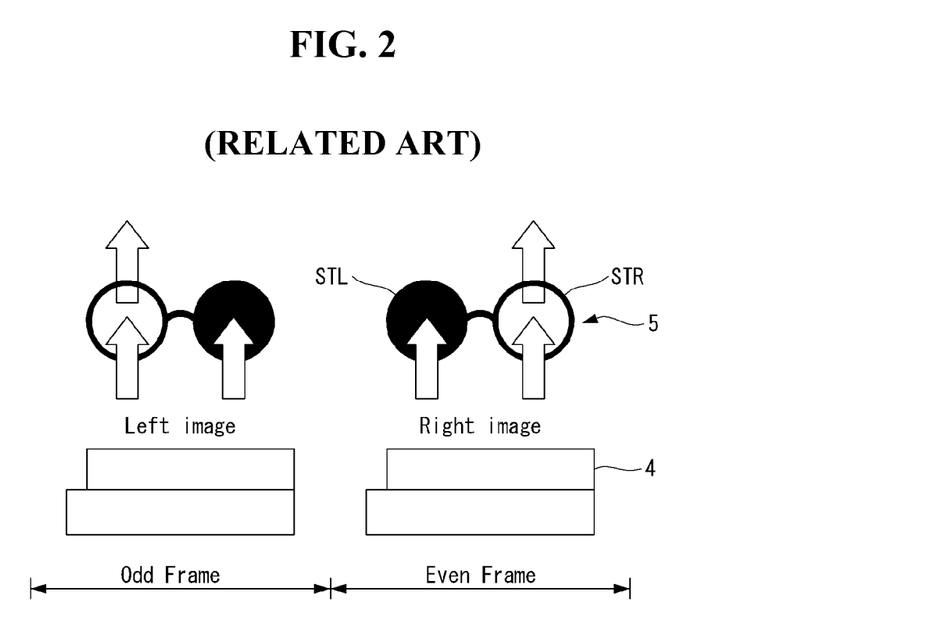
FIG. 2 is a diagram illustrating a liquid crystal shutter glasses type in the related art.

The liquid crystal shutter glasses type displays left images and right images on a display element 4 with frame units as shown in FIG. 2, and implements 3D images by opening and closing left and right shutters of liquid crystal shutter glasses 5 in synchronization with the display timings. The liquid crystal shutter glasses 5 open only their left shutter during odd frame periods when the left images are displayed, and open only their right shutter during even frame periods when the right images are display, thereby creating binocular parallax in a temporal division manner.

In the liquid crystal shutter glasses type, the luminance of the 3D images is low due to the short turned-on time of the liquid crystal shutter glasses 5, and 3D crosstalk considerably occurs depending on the synchronization between the display element 4 and the liquid crystal shutter glasses 5, and on-and-off state switching response characteristics.

SUMMARY

Embodiments of this document provide a stereoscopic image display device and a driving method thereof capable of reducing 3D crosstalk and increasing luminance and increasing each of the vertical resolutions of left and right images.

According to an exemplary embodiment, there is provided a stereoscopic image display device including a display panel that is provided with a pixel array; a rendering processing unit that performs rendering for odd left image data so as to correspond to odd numbered display lines of the pixel array and for even right image data so as to correspond to even display lines of the pixel array during an n-th frame period, and performs rendering for odd right image data so as to correspond to the odd display lines of the pixel array and for even left image data so as to correspond to the even numbered display lines of the pixel array during a (n+1)-th frame period; a patterned retarder including a first retarder that transmits light which is incident from the odd numbered display lines of the pixel array so as to be modulated into first circularly polarized light, and a second retarder that transmits light which is incident from the even numbered display lines of the pixel array so as to be modulated into second circularly polarized light; active retarder glasses including a first active retarder that transmits one of the first circularly polarized light and the second circularly polarized light from the patterned retarder, and a second active retarder that transmits the remaining one of the first circularly polarized light and the second circularly polarized light from the patterned retarder; and a control unit that generates a switchable control signal and controls light transmission wavelengths in the first and second active retarders.

The rendering processing unit may receive left image data and right image data from an external device, divide the left image data into odd left image data which is applied to the odd numbered display lines of the pixel array and even left image data which is applied to the even numbered display lines of the pixel array during the n-th frame period, and divide the right image data into odd right image data which is applied to the odd numbered display lines of the pixel array and even right image data which is applied to the even numbered display lines of the pixel array during the (n+1)-th frame period.

The control unit may generate the switchable control signal having a second logic value during the n-th frame period and generate the switchable control signal having a first logic value during the (n+1)-th frame period.

The first active retarder may include a first circular polarization plate which transmits the first circularly polarized light therethrough, and a left eye cell having a liquid crystal layer of which an operation is controlled depending on the switchable control signal. In addition, the first active retarder may transmit the first circularly polarized light when the left eye cell enters an off state in response to the switchable control signal having the second logic value, and transmit the second circularly polarized light when the left eye cell enters an on state in response to the switchable control signal having the first logic value.

The second active retarder may include a second circular polarization plate which transmits the second circularly polarized light therethrough, and a right eye cell having a liquid crystal layer of which an operation is controlled depending on the switchable control signal. In addition, the second active retarder may transmits the second circularly polarized light when the right eye cell enters an off state in response to the switchable control signal having the second logic value, and transmit the first circularly polarized light when the right eye cell enters an on state in response to the switchable control signal having the first logic value.

The odd left image data and the even right image data may be addressed within a first half section of the n-th frame period, and the addressed state may be maintained during a second half section of the n-th frame period. Further, the odd right image data and the even left image data may be addressed within a first half section of the (n+1)-th frame period, and the addressed state may be maintained during a second half section of the (n+1)-th frame period.

The stereoscopic image display device may further include a backlight that irradiates the display panel with light. In this case, the control unit may control the backlight to be turned off during the first half sections of the n-th frame period and the (n+1)-th frame period, and control the backlight to be turned on during the second half sections of the n-th frame period and the (n+1)-th frame period.

According to an exemplary embodiment, there is provided a driving method of a stereoscopic image display device including a display panel provided with a pixel array, and a patterned retarder including a first retarder that transmits light which is incident from odd numbered display lines of the pixel array so as to be modulated into first circularly polarized light and a second retarder that transmits light which is incident from even numbered display lines of the pixel array so as to be modulated into second circularly polarized light, the method comprising performing rendering for odd left image data so as to correspond to odd numbered display lines of the pixel array and for even right image data so as to correspond to even display lines of the pixel array during an n-th frame period, and performing rendering for odd right image data so as to correspond to the odd display lines of the pixel array and for even left image data so as to correspond to the even numbered display lines of the pixel array during a (n+1)-th frame period; generating a switchable control signal in order to control light transmission wavelengths in active retarder glasses; causing a first active retarder of the active retarder glasses to transmit one of the first circularly polarized light and the second circularly polarized light from the patterned retarder in response to the switchable control signal; and causing a second active retarder of the active retarder glasses to transmit the remaining one of the first circularly polarized light and the second circularly polarized light from the patterned retarder in response to the switchable control signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Hereinafter, exemplary embodiments of this document will be described in detail with reference to FIGS. 3 to 7.

Figure 3:
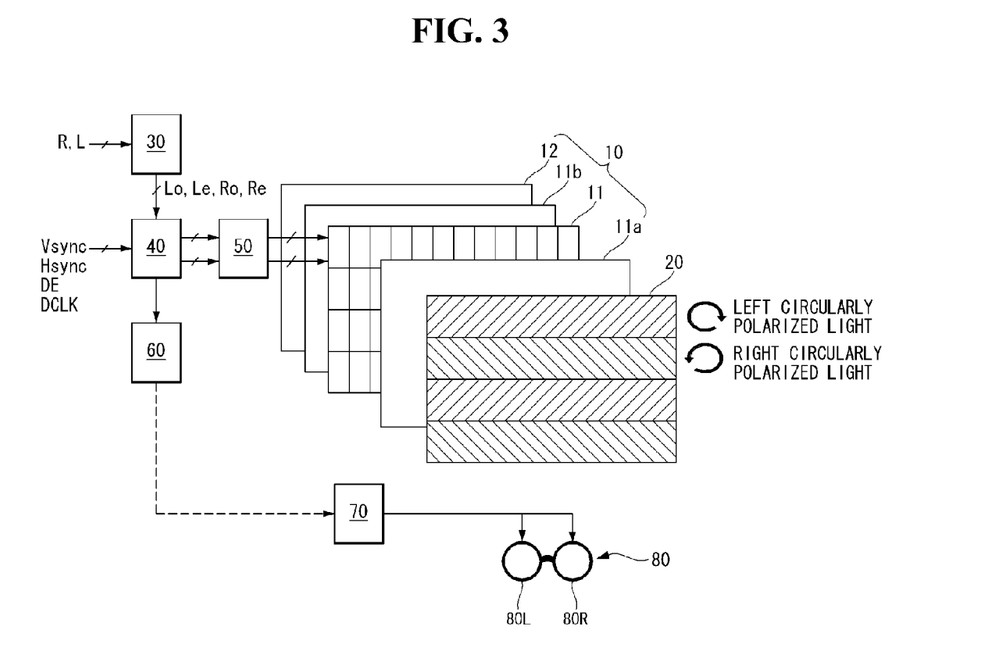
FIG. 3 is a diagram illustrating a stereoscopic image display device according to an embodiment of this document.

FIG. 3 shows a stereoscopic image display device according to an embodiment of this document.

In FIG. 3, the stereoscopic image display device includes a display element 10, a patterned retarder 20, a rendering processing unit 30, a control unit 40, a panel driving unit 50, a glasses control signal transmitter 60, a glasses control signal receiver 70, and active retarder glasses 80.

The display element 10 may be implemented by a flat display device such as a liquid crystal display (LCD), a field emission display (FED), a plasma display panel (PDP), an electroluminescence device (EL) including inorganic electroluminescence device and an organic light emitting diode (OLED) display, an electrophoresis display (EPD), or the like. Hereinafter, the display element 10 will be described mainly based on the LCD.

The LCD includes a display panel 11, an upper polarizer 11a, and a lower polarizer 11b.

The display panel 11 is provided with two glass substrates with a liquid crystal layer interposed between the two glass substrates. The display panel 11 includes liquid crystal cells arranged in a matrix at the intersections of data lines and gate lines. The lower glass substrate of the display panel 11 is provided with a pixel array including the data lines, the gate lines, thin film transistors (TFTs), pixel electrodes, and storage capacitors. The liquid crystal cells are driven by electric fields generated between the pixel electrodes connected to the TFTs and common electrodes. The upper glass substrate of the display panel 11 is provided with black matrices, color filters, and the common electrodes. Polarizers 11a and 11b are respectively attached to the lower and upper glass substrates of the display panel 11, and alignment layers are formed to set pretilt angles of the liquid crystal layer. The common electrodes are disposed on the upper glass substrate in a vertical electric field driving type such as a TN (twisted nematic) mode and a VA (vertical alignment) mode, and are disposed on the lower glass substrate along with the pixel electrodes in a horizontal electric field type such as an IPS (in plane switching) mode and an FFS (fringe field switching) mode. Column spacers may be disposed between the upper glass substrate and the lower glass substrate so as to maintain the cell gap of the liquid crystal cells.

The display panel 11 may be implemented by a liquid crystal display panel of any other type as well as liquid crystal display panels of the TN mode, the VA mode, the IPS mode, and the FFS mode. The LCD of this document may be implemented by any other type, for example, such as a transmissive LCD, a transflective LCD, a reflective LCD, or the like. The transmissive LCD and the transflective LCD require a backlight unit. The backlight unit may be implemented by a direct type backlight unit or an edge type backlight unit.

The patterned retarder 20 is attached onto the upper polarizer 11a of the display panel 11. First retarders are formed in odd numbered lines of the patterned retarder 20 and second retarders are formed in even numbered lines of the patterned retarder 20. Light absorption axes of the first retarder and second retarder are perpendicular to each other. The first retarders of the patterned retarder 20 correspond to the odd numbered display lines of the pixel array 10 and transmit light which is incident from the odd numbered display lines of the pixel array so as to be modulated into first circularly polarized light. The second retarders of the patterned retarder 20 correspond to the even numbered display lines of the pixel array and transmit light which is incident from the even numbered display lines of the pixel array so as to be modulated into second circularly polarized light. The first retarder of the patterned retarder 20 may be implemented by a polarization filter transmitting left circularly polarized light, and the second retarder of the patterned retarder 20 may be implemented by a polarization filter transmitting right circularly polarized light.

Figure 4:
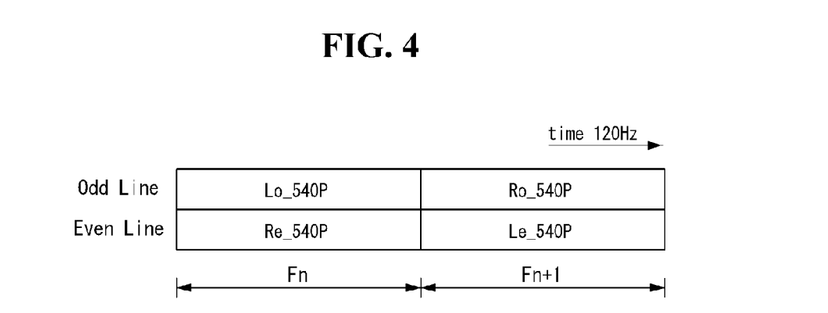
FIG. 4 is a diagram illustrating an example of data rendering.

The rendering processing unit 30 receives left image data L and right image data R from an external 3D formatter (not shown). The rendering processing unit 30 divides the received left image data L into odd left image data Lo which is applied to the odd numbered display lines of the pixel array and even left image data Le which is applied to the even numbered display lines of the pixel array. In addition, the rendering processing unit 30 divides the received right image data R into odd right image data Ro which is applied to the odd numbered display lines and even right image data Re which is applied to the even numbered display lines. The rendering processing unit 30 performs rendering for the data Lo, Le, Ro and Re divided as shown in FIG. 4 such that the vertical resolution of each of the left eye and the right images is increased. Referring to FIG. 4, the rendering processing unit 30 performs the rendering for the odd left image data Lo so as to correspond to the odd numbered display lines and for the even right image data Re so as to correspond to the even numbered display lines, during the n-th frame period Fn. Further, the rendering processing unit 30 performs the rendering for the odd right image data Ro so as to correspond to the odd numbered display lines and for the even left image data Le so as to correspond to the even numbered display lines, during the (n+1)-th frame period Fn+1. In FIG. 4, "540P" indicates resolution taken up by the rendering data Lo, Le, Ro and Re when the vertical resolution of 3D images is realized by FHD (Full High Definition) (1920(width)×1080(height)).

The control unit 40 receives timing signals such as a vertical synchronization signal Vsync, a horizontal synchronization signal Hsync, a data enable signal DE, and dot clocks DCLK from an external system board (not shown), and generates control signals for controlling operation timings of the panel driving unit 50 and a switchable control signal for switching polarization directions in the active retarder glasses 80.

The control unit 40 supplies the rendering data Lo, Le, Ro and Re output from the rendering processing unit 30 to the panel driving unit 50. The control unit 40 may transmit the rendering data Lo, Le, Ro and Re to the panel driving unit 50 at a frame frequency of the multiple i Hz (where i is an integer equal to or more than 2) of an input frame frequency. The input frame frequency is 60 Hz in the NTSC (National Television Standard Committee) system and 50 Hz in the PAL (Phase-Alternating Line) system. In the following description, the frame frequency is described as 120 Hz, but is not limited thereto, and it is noted that the frame frequency may be 100 Hz, 150 Hz, 180 Hz, 200 Hz, 240 Hz, and so on.

The panel driving unit 50 includes a data driver for driving the data lines of the display panel 11 and a gate driver for driving the gate lines of the display panel 11.

Each of source drive ICs of the data driver includes a shift register, a latch, a digital to analog converter (DAC), an output buffer, and so forth. The data driver latches the rendering data Lo, Le, Ro and Re under the control of the control unit 40. The data driver converts the rendering data Lo, Le, Ro and Re into analog positive gamma compensation voltages and analog negative gamma compensation voltages in response to a polarity control signal and in turn reverses the polarities of the data voltages. The data driver outputs data voltages synchronized with gate pulses output from the gate driver, to the data lines. The source drive ICs of the data driver may be mounted on a TCP (Tape Carrier Package) and be joined to the lower glass substrate of the display panel 11 through a TAB (Tape Automated Bonding) process.

The gate driver includes a shift register, a multiplexer array, a level shifter, and so on. The gate driver sequentially supplies gate pulses (or scan pulses) to the gate lines under the control of the control unit 40. The gate driver may be mounted on a TCP and be joined to the lower glass substrate of the display panel 11 through the TAB process, or may be directly formed on the lower glass substrate along with the pixel array through a GIP (Gate In Panel) process.

The glasses control signal transmitter 60 is connected to the control unit 40, and transmits the switchable control signal output from the control unit 40 to the glasses control signal receiver 70 via a wired or wireless interface. The glasses control signal receiver 70, which is provided in the active retarder glasses 80, receives the switchable control signal via a wired or wireless interface, and switches polarization directions in a left eye 80L and a right eye 80R of the active retarder glasses 80 in response to the switchable control signal.

The active retarder glasses 80 includes the left eye 80L and the right eye 80R which are electrically controlled at the same time.

Figure 5:
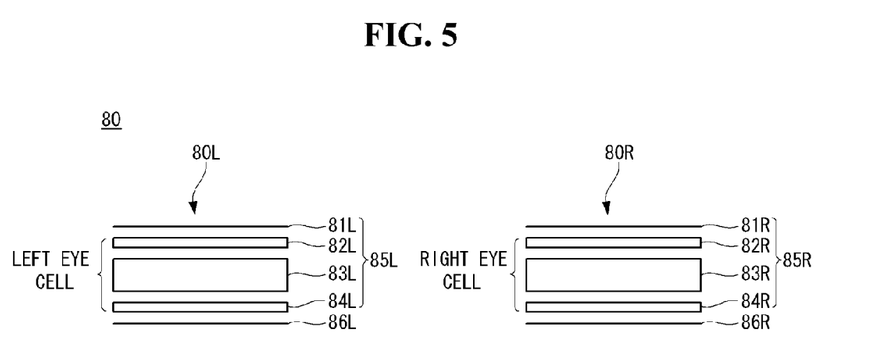
FIG. 5 is a diagram illustrating active retarder glasses in detail.

The left eye 80L of the active retarder glasses 80 has a first active retarder 85L and a first linear polarization filter 86L as shown in FIG. 5. The first active retarder 85L includes a first circular polarization plate 81L which transmits first circularly polarized light therethrough, and a left eye cell of which an operation is controlled in response to the switchable control signal. The left eye cell includes a first transparent electrode 82L, a second transparent electrode 84L, and a liquid crystal layer 83L interposed between the first and second transparent electrodes 82L and 84L.

The right eye 80R of the active retarder glasses 80 includes a second active retarder 85R and a second linear polarization filter 86R. The second active retarder 85R includes a second circular polarization plate 81R which transmits second circularly polarized light therethrough, and a right eye cell of which an operation is controlled in response to the switchable control signal. The right eye cell includes a first transparent electrode 82R, a second transparent electrode 84R, and a liquid crystal layer 83R interposed between the first and second transparent electrodes 82R and 84R.

The first transparent electrodes 82L and 82R are supplied with a reference voltage, and the second transparent electrodes 84L and 84R are supplied with turning-on and turning-off voltages. When the switchable control signal with a first logic value is input to the glasses control signal receiver 70, the turning-on voltage is supplied to the second transparent electrodes 84L and 84R, and when the switchable control signal with a second logic value is input to the glasses control signal receiver 70, the turning-off voltage is supplied to the second transparent electrodes 84L and 84R. The liquid crystal layers 83L and 83R have the phase delay of $0\lambda$, when the turning-off voltage is supplied to the second transparent electrodes 84L and 84R, and thus the polarization directions in the first and second active retarder 85L and 85R are not changed. In contrast, the liquid crystal layers 83L and 83R have the phase delay of $\lambda/2$ when the turning-on voltage is supplied to the second transparent electrodes 84L and 84R, and thus the polarization directions in the first and second active retarder 85L and 85R are respectively delayed by 90 degrees.

The first active retarder 85L transmits the first circularly polarized light therethrough when the turning-off voltage is supplied to the second transparent electrode 84L, and transmits the second circularly polarized light therethrough when the turning-on voltage is supplied to the second transparent electrode 84L. The second active retarder 85R transmits the second circularly polarized light therethrough when the turning-off voltage is supplied to the second transparent electrode 84R, and transmits the first circularly polarized light when the turning-on voltage is supplied to the second transparent electrode 84R.

The first linear polarization filter 86L enables light corresponding to a left image to travel only toward the left eye 80L, and the second linear polarization filter 86R enables light corresponding to a right image to travel only toward the right eye 80R. For this, the first and second linear polarization filters 86L and 86R are manufactured such that the polarization directions therein are substantially the same as each other. As an example, the first and second linear polarization filters 86L and 86R are manufactured so as to be substantially the same as the lower polarizer 11b of the display panel 11.

Figure 6:
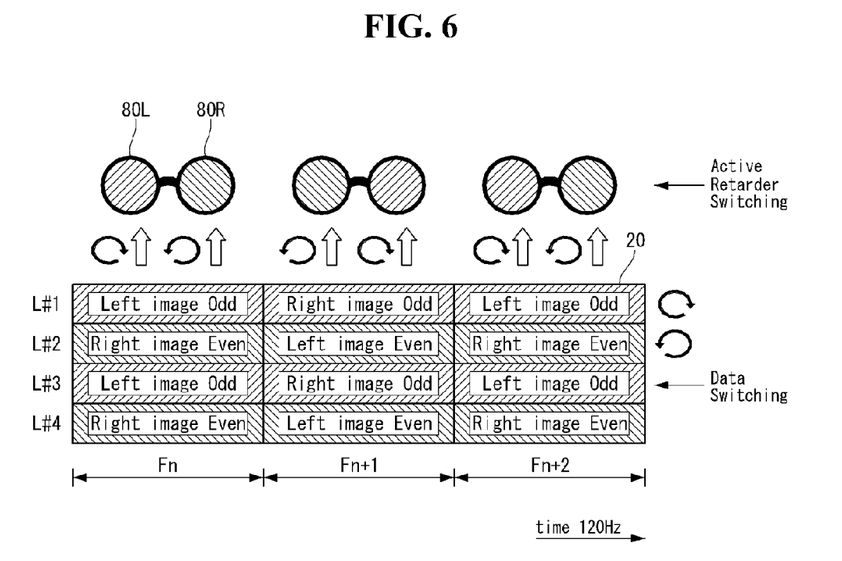
FIG. 6 is a diagram schematically illustrating an operation principle of this document for increasing each of the vertical resolutions of left eye and right images.

FIG. 6 shows an operation principle of this document for increasing the vertical resolution of each of the left eye and the right images.

Referring to FIG. 6, during the n-th frame period Fn and the (n+2)-th frame period Fn+2, the odd left image data is displayed on the odd numbered display lines L#1 and L#3 of the pixel array, and the even right image data is displayed on the even numbered display lines L#2 and L#4 of the pixel array.

The first retarders of the patterned retarder 20 correspond to the odd numbered display lines of the pixel array, and transmit light corresponding to the odd left images, which is incident from the odd numbered display lines of the pixel array, so as to be modulated into left circularly polarized light. The second retarders of the patterned retarder 20 correspond to the even numbered display lines of the pixel array, and transmit light corresponding to the even right images, which is incident from the even numbered display lines of the pixel array, so as to be modulated into right circularly polarized light.

The left eye 80L of the active retarder glasses 80 transmits the left circularly polarized light from the first retarder in response to the switchable control signal with the second logic value, and the right eye 80R of the active retarder glasses 80 transmits the right circularly polarized light from the second retarder in response to the switchable control signal with the second logic value.

In FIG. 6, during the (n+1)-th frame period Fn+1, odd right image data is displayed on the odd numbered display lines L#1 and L#3 of the pixel array, and even left image data is displayed on the even numbered display lines L#2 and L#4. In the related art, the odd right image data and the odd left image data are not displayed in the polarization glasses type. However, in this document, the (n+1)-th frame period Fn+1 is inserted between the n-th frame period Fn and the (n+2)-th frame period Fn+2, and the odd right image data and the even left image data are made to be displayed. Hence, the vertical resolution of each of the left eye and right images increases, so that the vertical resolution of each of the left eye and right images is substantially equal to the physically vertical resolution of the panel.

The first retarders of the patterned retarder 20 correspond to the odd numbered display lines of the pixel array, and transmit light corresponding to the odd right images, which is incident from the odd numbered display lines of the pixel array, so as to be modulated into left circularly polarized light. The second retarders of the patterned retarder 20 correspond to the even numbered display lines of the pixel array, and transmit light corresponding to the even left images, which is incident from the even numbered display lines of the pixel array, so as to be modulated into right circularly polarized light.

The right eye 80R of the active retarder glasses 80 transmits the left circularly polarized light from the first retarder in response to the switchable control signal with the first logic value, and the left eye 80L of the active retarder glasses 80 transmits the right circularly polarized light from the second retarder in response to the switchable control signal with the first logic value.

Figure 7:
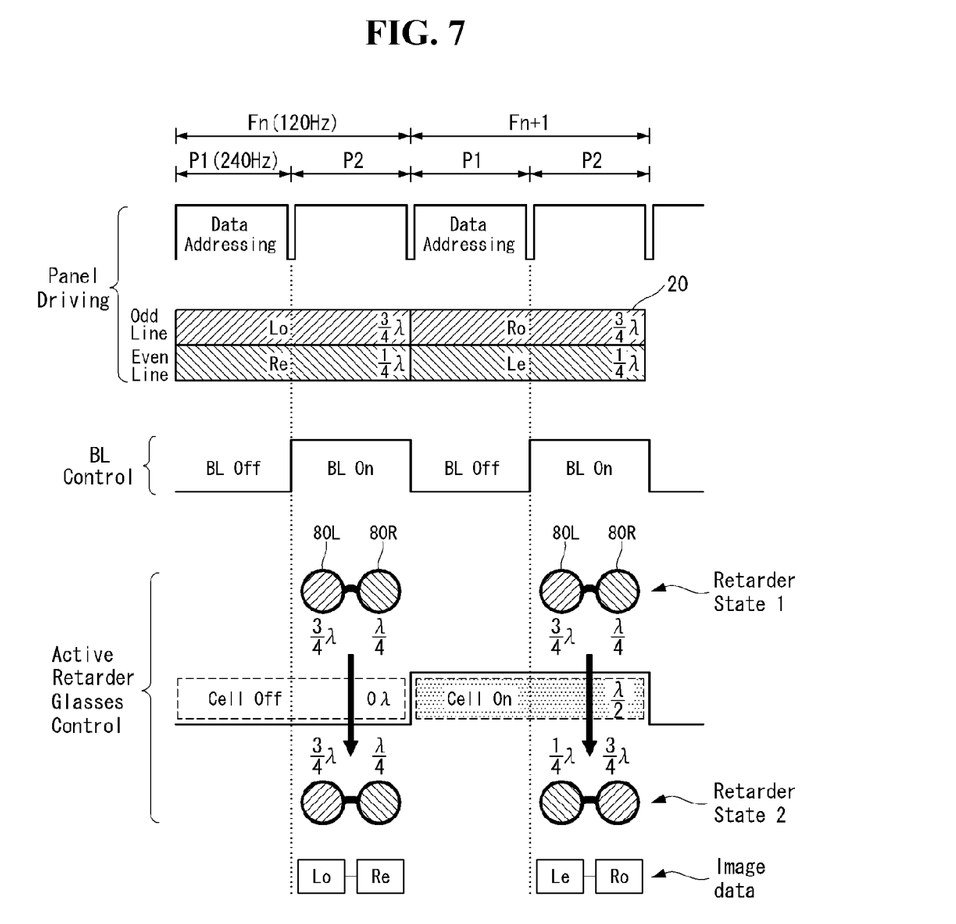
FIG. 7 is a diagram illustrating in detail driving of a display panel, an operation of a backlight, and an operation state of active retarder glasses during the n-th frame period and the (n+1)-th frame period in FIG. 6.

FIG. 7 shows in detail driving of the display panel, an operation of the backlight, and operation states of the active retarder glasses during the n-th frame period Fn and the (n+1)-th frame period Fn+1 in FIG. 6.

Referring to FIG. 7, during the n-th frame period Fn, the odd left image data Lo is displayed on the odd numbered display lines of the display panel, and the even right image data Re is displayed on the even numbered display lines of the display panel. For such displays, the odd left image data Lo and the even right image data Re are addressed within the first half section P1 of the n-th frame period Fn, and the addressed state is maintained during the second half section P2 of the n-th frame period Fn. The first retarder of the patterned retarder 20 transmits light corresponding to the odd left image data Lo to be modulated into left circularly polarized light (for example, 3λ/4), and the second retarder of the patterned retarder 20 transmits light corresponding to the even right image data Re to be modulated into right circularly polarized light (for example, λ/4). The backlight of the backlight unit is turned off during the first half section P1 of the n-th frame period Fn and is turned on during the second half section P2 of the n-th frame period Fn. The left eye cell and the right eye cell of the active retarder glasses 80 enter an off state (phase delay of 0λ in response to the switchable control signal with the second logic value, thus the left eye 80L transmits an left image of the left circularly polarized light (3λ/4) which is incident from the first retarder, and the right eye 80R transmits an right image of the right circularly polarized light (λ/4) which is incident from the second retarder.

During the (n+1)-th frame period Fn+1, the odd right image data Ro is displayed on the odd numbered display lines of the display panel, and even left image data Le is displayed on the even numbered display lines of the display panel. For such displays, the odd right image data Ro and the even left image data Le are addressed within the first half section P1 of the (n+1)-th frame period Fn+1, and the addressed state is maintained during the second half section P2 of the (n+1)-th frame period Fn+1. The first retarder of the patterned retarder 20 transmits light corresponding to the odd right image data Ro to be modulated into left circularly polarized light (for example, 3λ/4), and the second retarder of the patterned retarder 20 transmits light corresponding to the even left image data Le to be modulated into right circularly polarized light (for example, λ/4). The backlight of the backlight unit is turned off during the first half section P1 of the (n+1)-th frame period Fn+1 and is turned on during the second half section P2 of the (n+1)-th frame period Fn+1. The left eye cell and the right eye cell of the active retarder glasses 80 enter an on state (phase delay of λ/2) in response to the switchable control signal with the first logic value, thus the left eye 80L transmits an left image of the right circularly polarized light (λ/4) which is incident from the second retarder, and the right eye 80R transmits an right image of the left circularly polarized light (3λ/4) which is incident from the first retarder.

As described above, in the stereoscopic image display device and the driving method thereof according to the embodiment of this document, the data switching and the polarization direction switching in the active retarder glasses are performed through the data rendering. In the data switching, odd left image data and even right image data are respectively displayed on the even numbered display lines and the odd numbered display lines of the display panel during odd frames, and odd right image data and even left image data are respectively displayed on the odd numbered display lines and the even numbered display lines of the display. In addition, in the polarization direction switching, during odd frames, the left eye of the active retarder glasses transmits a left image of left circularly polarized light which is incident from the first retarder and the right eye thereof transmits a right image of right circularly polarized light which is incident from the second retarder during odd frames, and, during even frames, the left eye of the active retarder glasses transmits a left image of right circularly polarized light which is incident from the second retarder and the right eye thereof transmits a right image of left circularly polarized light which is incident from the first retarder.

As a result, the stereoscopic image display device and the driving method thereof according to the embodiment of this document can increase luminance of 3D images and reduce 3D crosstalk as compared with the liquid crystal shutter glasses type in the related art, and increase each of the vertical resolutions of left eye and right images as compared with the polarization glasses type in the related art.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display device, comprising:
    a display panel that is provided with a pixel array;
    a rendering processing unit that performs rendering for odd left image data so as to correspond to odd numbered display lines of the pixel array and for even right image data so as to correspond to even display lines of the pixel array during an n-th frame period, and performs rendering for odd right image data so as to correspond to the odd display lines of the pixel array and for even left image data so as to correspond to the even numbered display lines of the pixel array during a (n+1)-th frame period;
    a patterned retarder including a first retarder that transmits light which is incident from the odd numbered display lines of the pixel array so as to be modulated into first circularly polarized light, and a second retarder that transmits light which is incident from the even numbered display lines of the pixel array so as to be modulated into second circularly polarized light;
    active retarder glasses including a first active retarder that transmits one of the first circularly polarized light and the second circularly polarized light from the patterned retarder, and a second active retarder that transmits the remaining one of the first circularly polarized light and the second circularly polarized light from the patterned retarder; and
    a control unit that generates a switchable control signal having a first logic value or a second logic value and controls phase delays in the first and second active retarders.

2. The stereoscopic image display device of claim 1, wherein the rendering processing unit receives left image data and right image data from an external device, divides the left image data into odd left image data which is applied to the odd numbered display lines of the pixel array during the n-th frame period and even left image data which is applied to the even numbered display lines of the pixel array during the (n+1)-th frame period, and divides the right image data into odd right image data which is applied to the odd numbered display lines of the pixel array during the (n+1)-th frame period and even right image data which is applied to the even numbered display lines of the pixel array during the n-th frame period.

3. The stereoscopic image display device of claim 1, wherein the control unit generates the switchable control signal having the second logic value during the n-th frame period and generates the switchable control signal having the first logic value during the (n+1)-th frame period.

4. The stereoscopic image display device of claim 3, wherein the first active retarder includes a first circular polarization plate which transmits the first circularly polarized light therethrough, and a left eye cell having a liquid crystal layer of which an operation is controlled depending on the switchable control signal, and
    wherein the first active retarder transmits the first circularly polarized light when the left eye cell enters an off state in response to the switchable control signal having the second logic value, and transmits the second circularly polarized light when the left eye cell enters an on state in response to the switchable control signal having the first logic value.

5. The stereoscopic image display device of claim 3, wherein the second active retarder includes a second circular polarization plate which transmits the second circularly polarized light therethrough, and a right eye cell having a liquid crystal layer of which an operation is controlled depending on the switchable control signal, and
    wherein the second active retarder transmits the second circularly polarized light when the right eye cell enters an off state in response to the switchable control signal having the second logic value, and transmits the first circularly polarized light when the right eye cell enters an on state in response to the switchable control signal having the first logic value.

6. The stereoscopic image display device of claim 1, wherein the odd left image data and the even right image data are addressed within a first half section of the n-th frame period, and the addressed state is maintained during a second half section of the n-th frame period, and
    wherein the odd right image data and the even left image data are addressed within a first half section of the (n+1)-th frame period, and the addressed state is maintained during a second half section of the (n+1)-th frame period.

7. The stereoscopic image display device of claim 6, further comprising a backlight that irradiates the display panel with light,
    wherein the control unit controls the backlight to be turned off during the first half sections of the n-th frame period and the (n+1)-th frame period, and controls the backlight to be turned on during the second half sections of the n-th frame period and the (n+1)-th frame period.

8. A driving method of a stereoscopic image display device including a display panel provided with a pixel array, and a patterned retarder including a first retarder that transmits light which is incident from odd numbered display lines of the pixel array so as to be modulated into first circularly polarized light and a second retarder that transmits light which is incident from even numbered display lines of the pixel array so as to be modulated into second circularly polarized light, the method comprising:

performing rendering for odd left image data so as to correspond to odd numbered display lines of the pixel array and for even right image data so as to correspond to even display lines of the pixel array during an n-th frame period, and performing rendering for odd right image data so as to correspond to the odd display lines of the pixel array and for even left image data so as to correspond to the even numbered display lines of the pixel array during a (n+1)-th frame period;

generating a switchable control signal having a first logic value or a second logic value in order to control phase delays in active retarder glasses;

causing a first active retarder of the active retarder glasses to transmit one of the first circularly polarized light and the second circularly polarized light from the patterned retarder in response to the switchable control signal; and causing a second active retarder of the active retarder glasses to transmit the remaining one of the first circularly polarized light and the second circularly polarized light from the patterned retarder in response to the switchable control signal.

9. The driving method of claim 8, wherein the step of performing of the rendering further includes:

receiving left image data and right image data from an external device;

dividing the left image data into odd left image data which is applied to the odd numbered display lines of the pixel array during the n-th frame period and even left image data which is applied to the even numbered display lines of the pixel array during the (n+1)-th frame period; and dividing the right image data into odd right image data which is applied to the odd numbered display lines of the pixel array during the (n+1)-th frame period and even right image data which is applied to the even numbered display lines of the pixel array during the n-th frame period.

10. The driving method of claim 8, wherein the switchable control signal having the second logic value is generated during the n-th frame period, and the switchable control signal having the first logic value is generated during the (n+1)-th frame period.

11. The driving method of claim 10, wherein the first active retarder includes a first circular polarization plate which transmits the first circularly polarized light therethrough, and a left eye cell having a liquid crystal layer of which an operation is controlled depending on the switchable control signal, and wherein the first active retarder transmits the first circularly polarized light when the left eye cell enters an off state in response to the switchable control signal having the second logic value, and transmits the second circularly polarized light when the left eye cell enters an on state in response to the switchable control signal having the first logic value.

12. The driving method of claim 10, wherein the second active retarder includes a second circular polarization plate which transmits the second circularly polarized light therethrough, and a right eye cell having a liquid crystal layer of which an operation is controlled depending on the switchable control signal, and wherein the second active retarder transmits the second circularly polarized light when the right eye cell enters an off state in response to the switchable control signal having the second logic value, and transmits the first circularly polarized light when the right eye cell enters an on state in response to the switchable control signal having the first logic value.

13. The driving method of claim 8, wherein the odd left image data and the even right image data are addressed within a first half section of the n-th frame period, and the addressed state is maintained during a second half section of the n-th frame period, and wherein the odd right image data and the even left image data are addressed within a first half section of the (n+1)-th frame period, and the addressed state is maintained during a second half section of the (n+1)-th frame period.

14. The driving method of claim 13, wherein a backlight which irradiates the display panel with light is controlled to be turned off during the first half sections of the n-th frame period and the (n+1)-th frame period, and is controlled to be turned on during the second half sections of the n-th frame period and the (n+1)-th frame period.

* * * * *